United States Patent [19]

Wagner et al.

[11] Patent Number: 4,746,385
[45] Date of Patent: May 24, 1988

[54] PROCESS FOR COVERING AN INTERIOR PART WITH A LAYER OF LEATHER

[75] Inventors: Dieter Wagner, Oberriexingen; Axel Braeuer, Guentersleben; Eugen Schray, Oberriexingen, all of Fed. Rep. of Germany

[73] Assignee: Dr. Ing. h.c.F. Porsche Aktiengesellschaft, Stuttgart, Fed. Rep. of Germany

[21] Appl. No.: 16,948

[22] Filed: Feb. 20, 1987

[30] Foreign Application Priority Data

Feb. 27, 1986 [DE] Fed. Rep. of Germany ....... 3606375

[51] Int. Cl.⁴ .......................... B32B 31/24; B32B 9/04
[52] U.S. Cl. ................................... 156/155; 156/281; 156/322; 427/155; 428/473
[58] Field of Search ............... 156/153, 155, 322, 281; 427/154, 155; 428/473

[56] References Cited

U.S. PATENT DOCUMENTS 2,484,937 10/1949 Dickinson ...................... 428/473 X
3,193,424 7/1965 Scott ............................... 156/153 X

FOREIGN PATENT DOCUMENTS 2046318 4/1972 Fed. Rep. of Germany .
3438489 5/1985 Fed. Rep. of Germany .

OTHER PUBLICATIONS

B. Kujawa-Penczek et al., "Polyurethan-Klebstoffe: Fortschritt in den 80er Jahren", *Adhasion* 1984, Heft 3 (Issue 3), pp. 7–12.

*Primary Examiner*—Robert A. Dawson
*Attorney, Agent, or Firm*—Barnes & Thornburg

[57] ABSTRACT

A process is provided for covering an interior part with a layer of leather. The process includes subjecting a layer of leather to a heat treatment. A water-soluble protective film is then applied to the decorative upper side of the leather. The area of the interior part that is to be covered is cleaned using a solvent. An adhesive agent is applied to the cleaned area of the interior part using a brush. An adhesive agent is sprayed onto the backside of the leather layer. The two adhesive agents on the interior part and on the leather layer are ventilated. The leather layer is then applied to the interior part, and the water-soluble protective film on the decorative upper side of the leather is removed. The adhesive agent is then hardened.

28 Claims, 1 Drawing Sheet

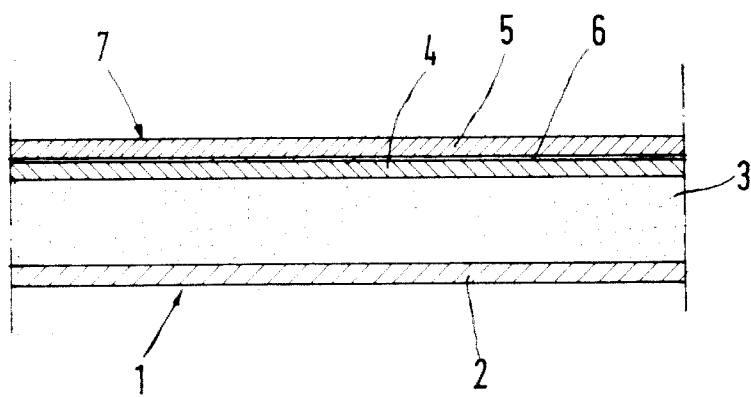

PROCESS FOR COVERING AN INTERIOR PART WITH A LAYER OF LEATHER

BACKGROUND AND SUMMARY OF THE INVENTION

The invention relates to a process for the covering of an interior part, particularly for vehicles, with a layer of leather that, by means of an adhesive agent, is applied to a layer of PU, ABS-foil or PVC-foil.

It is generally known to subsequently provide a layer of leather to interior parts of a vehicle that are covered by a covering made of an ABS-foil or a PVC-foil in order to provide to the passenger compartment a high-quality appearance and added comfort to passengers, such parts include the dashboard, the door coverings, the center console or the headlining. A known unpublicized process used for this purpose included, first, cleaning the covering of the interior part. After this cleaning, a contact adhesive (neoprene adhesive) was applied to the interior part and to the back side of the leather layer by a paint brush. After the ventilating of the adhesive agent, the layer of leather was applied to the interior part by hand.

A disadvantage of this process is that the thickness of the adhesive layer is often uneven because the adhesive agent is applied to the leather layer using a paint brush. When this unevenness occurs, particularly in zones of a large thickness of the adhesive layer, the solvent of the adhesive agent attacks the coloring pigments of the leather, resulting in permanent spots on the visible upper side of the leather. In addition, in this known process, no measures are taken at the visible upper side of the leather in order to avoid soiling or damage during the gluing of the leather layer. When soiling or other damage occurs, residues of adhesive agent on the visible upper side of the leather can no longer be removed. In addition, it may happen that during this process at relatively high temperatures (about 130°), the leather layer may come detached from the ABS-foil or PVC-foil layer because the existing contact adhesives (neoprene adhesives) are suitable only for short periods of time at such high temperatures.

One object of the invention is to provide a simple process in which an interior part is subsequently covered with a layer of leather.

Another object of the invention is to provide a process of covering an interior part with a leather layer in which damage and soiling of the visible upper side of the leather is prevented.

Another object of the invention is to provide a process of covering an interior part with a layer of leather in which the leather layer does not become detached from layer of the interior part disposed underneath during long-term exposure to high temperatures.

These objects are achieved by providing a process for covering an interior part, having a layer of polyurethane ABS-foil or PVC-foil with a layer of leather. The process includes subjecting the leather layer to a heat treatment. A water-soluble protective film is applied to the decorative upper side of the layer. The area of the interior part that is to be covered is then cleaned by a solvent. An adhesive agent is applied to the cleaned area of the interior part by paint brush. An adhesive agent is then sprayed onto the back side of the leather layer. The two adhesive agents on the interior part and on the leather layer are ventilated. The leather layer is applied to the interior part, and the water-soluble protective film on the decorative upper side of the leather is removed. The adhesive agent is then hardened at room temperature for about forty-eight hours.

Using this process, a superior fastening of the layer of the interior part is provided, even during a long-term exposure to high temperature. Also, damaging and soiling of the visible surface of the leather is avoided.

By heat treating the leather layer before the gluing process, any existing moisture is withdrawn from it, and therefore the leather layer will not shrink after the gluing has taken place, which would result in a destruction of the adhesive layer.

The water-soluble protective film that is applied to the decorative upper side of the leather assures that residues of the adhesive during the gluing-on of the leather layer do not come into direct contact with the upper side of the leather, but only with the protective layer, and can therefore be removed in a simple way. By applying the adhesive to the backside of the leather by a spraying process, a relatively even and thin application of adhesive agent to the leather is achieved. Also, although the sprayable adhesive contains considerably more solvent than the brushable adhesive, a large part of the solvent contained in the adhesive volatilizes; i.e., the amount of solvent in the applied adhesive agent is much lower than when applied with a paint brush. After the gluing has taken place, the upper side of the leather is cleaned with a moist sponge or the like, and thus, the protective film and any possible soiling are removed without any problems.

In further advantageous features of one preferred embodiment of the invention, the leather layer is subjected to a temperature of 100°-110° C. in a drying stove for about four to six hours.

In further advantageous features of another embodiment of the invention, polyvinyl alcohol is used as the protective film.

In further advantageous features of another preferred embodiment of the invention, the adhesive agents for the interior part and for the leather layer are chemically the same kind. These adhesive agents are used with a polyurethane base with the addition of about 10% of hardener (cross-linking agent). The adhesive agent for the interior part has much less solvent than the adhesive agent for the leather layer.

In further advantageous features of another preferred embodiment of the invention, the adhesive agent for the interior part has a viscosity of about 4,800 mPas, and the viscosity of the sprayable adhesive agent is about 690 mPas.

In further advantageous features of another preferred embodiment of the invention, the water-soluble protective film is applied by spraying.

Other objects, advantages and novel features of the present invention will become apparent from the following detailed description of the invention when considered in conjunction with the accompanying drawing.

BRIEF DESCRIPTION OF THE FIGURE

The drawing FIGURE is a schematic cross-sectional view of an interior part covered with a layer of leather.

DETAILED DESCRIPTION OF THE DRAWING

An interior part 1 for a vehicle, such as a door covering, a dashboard or the like, includes a carrier part 2, a flexible padding layer 3 and a decorative layer 4 made of an ABS-foil or a PVC-foil or of polyurethane.

For the subsequent covering of the interior part 1 with a layer 5 of leather using of an adhesive agent 6, the following process is used. The leather layer 5 is subjected to a heat treatment. For this purpose, the leather layer 5 is put into a drying stove, and is subjected to a temperature of 100°–110° C. for about four to six hours. As a result, the moisture that still exists when the leather layer 5 is supplied (water content about 8% to 13%) is removed from the leather layer 5. Subsequently, a water-soluble protective film is applied to the decorative upper side 7 of the leather. This protective film is preferably sprayed on. Polyvinyl alcohol, for example, is suitable for being used as the protective film.

Subsequently, the area of the interior part 1 that is to be covered is cleaned using a solvent, before the adhesive agent is applied using a paint brush. As the adhesive agent, polyurethane with an addition of about 10% hardener (cross-linking agent) is used.

For the backside of the leather layer 5, an adhesive agent is used that chemically is of the same kind as that used for the interior part 1. However, the adhesive agent used on the leather layer 5 has a much larger proportion of solvent and is sprayable. The adhesive agent that is sprayed onto the leather layer 5 by a spray gun has a viscocity of about 690 mPas, whereas the viscosity of the brushable adhesive agent is about 4,800 mPas. Before the leather layer 5 is applied to the interior part 1, both adhesive agents are briefly ventilated. After the conclusion of the gluing process, the water-soluble protective film on the upper side of the leather is removed, for example, by a sponge saturated in water. For the hardening of the adhesive agent, the interior part 1 is suspended in a room temperature of 20° C. for a maximum of forty-eight hours. Subsequently, the interior part 1 can be installed into the vehicle, in which case, the leather layer 5 does not become detached from the interior part 1, even in the case of a prolonged exposure to a temperature of about 130°.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed:

1. Process for covering an interior part comprising:
   subjecting a leather layer to a heat treatment,
   applying a water-soluble protective film to a decorative upper side of the leather,
   cleaning by means of a solvent an area of the interior part that is to be covered,
   applying an adhesive agent to the cleaned area of the interior part and to a backside of the leather layer,
   ventilating the adhesive agents on the interior part and on the leather layer,
   applying the backside of the leather layer to the interior part in the area having said adhesive agent applied thereto,
   removing the water-soluble protective film from the decorative upper side of the leather, and
   hardening the adhesive agent.

2. Process as in claim 1, wherein said applying of a water-soluble protective film to the upper side of the leather includes spraying the water-soluble protective film on the leather.

3. Process as in claim 2, wherein said applying of a water-soluble protective film includes the use of polyvinyl alcohol.

4. Process for covering an interior part other than leather comprising:
   subjecting a leather layer to a heat treatment,
   cleaning by means of a solvent an area of the interior part that is to be covered,
   applying an adhesive agent to the cleaned area of the interior part and to a backside of the leather layer,
   ventilating the adhesive agents on the interior part and on the leather layer,
   applying the backside of the leather layer to the interior part in the area having said adhesive agent applied thereto, and
   hardening the adhesive agent.

5. Process as in claim 4, wherein said applying of an adhesive agent to the interior part and applying of an adhesive agent onto the leather layer include the use of adhesive agents that are chemically similar, including a polyurethane base with about 10% hardener, said applying of the adhesive agent to the interior part including an adhesive having much less solvent that the adhesive agent applied onto the leather layer.

6. Process as in claim 4, wherein said applying of an adhesive agent to the interior part includes the use of an adhesive agent having a viscosity of about 4,800 mPas, and wherein said applying of an adhesive agent to the leather layer includes the use of an adhesive agent having a viscosity of about 690 mPas.

7. Process as in claim 4, further including:
   applying a water-soluble protective film to a decorative upper side of the leather after subjecting the leather layer to heat treatment, and
   removing the water-soluble protective film from the decorative upper side of the leather before hardening the adhesive agent.

8. Process as in claim 7, wherein said hardening of the adhesive agent is performed at room temperature 20° C. for up to forty-eight hours.

9. Process as in claim 8, wherein said subjecting of the leather layer to a heat treatment is performed at a temperature of 100°–110° C. in a drying stove for about four to six hours.

10. Process as in claim 8, wherein said applying of an adhesive agent to the interior part and applying of an adhesive agent onto the leather layer include the use of adhesive agents that are chemically similar, including a polyurethane base with about 10% hardener, said applying of the adhesive agent to the interior part including the use of an adhesive having much less solvent than the adhesive agent being applied onto the leather layer.

11. Process as in claim 8, wherein said applying of an adhesive agent to the interior part includes the use of an adhesive agent having a viscosity of about 4,800 mPas, and wherein said applying of an adhesive agent to the leather layer includes the use of an adhesive agent having a viscosity of about 690 mPas.

12. Process as in claim 7, wherein said subjecting of the leather layer to a heat treatment is performed at a temperature of 100°–110° C. in a drying stove for about four to six hours.

13. Process as in claim 7, wherein said applying of a water-soluble protective film includes the use of polyvinyl alcohol.

14. Process as in claim 13, wherein said applying of a water-soluble protective film to the upper side of the leather includes spraying the water-soluble protective film on the leather.

15. Process as in claim 7, wherein said applying of an adhesive agent to the interior part and applying of an adhesive agent onto the leather layer include the use of adhesive agents that are chemically similar, including a polyurethane base with about 10% hardener, said applying of the adhesive agent to the interior part including an adhesive having much less solvent than the adhesive agent being applied onto the leather layer.

16. Process as in claim 7, wherein said applying of an adhesive agent to the interior part includes the use of an adhesive agent having a viscosity of about 4,800 mPas, and wherein said applying of an adhesive agent to the leather layer includes the use of an adhesive agent having a viscosity of about 690 mPas.

17. Process as in claim 7, wherein said applying of a water-soluble protective film to the upper side of the leather includes spraying the water-soluble protective film on the leather.

18. Process for covering an interior part comprising:
subjecting a leather layer to a heat treatment,
cleaning by means of a solvent an area of the interior part that is to be covered,
applying an adhesive agent to the cleaned area of the interior part and to a backside of the leather layer, said applying of the adhesive agent to the interior part and applying of the adhesive agent onto the leather layer including the use of adhesive agents that are chemically similar, including a polyurethane base with about 10% hardener, said applying of the adhesive agent to the interior part including an adhesive having much less solvent than the adhesive agent applied onto the leather layer,
ventilating the adhesive agents on the interior part and on the leather layer,
applying the backside of the leather layer to the interior part in the area having said adhesive agent applied thereto, and
hardening the adhesive agent.

19. Process for covering an interior part comprising:
subjecting a leather layer to a heat treatment,
cleaning by means of a solvent an area of the interior part that is to be covered,
applying an adhesive agent to the cleaned area of the interior part and to a backside of the leather layer, said applying of the adhesive agent to the interior part including the use of an adhesive agent having a viscosity of about 4,800 mPas, and said applying of the adhesive agent to the leather layer including the use of an adhesive agent having a viscosity of about 690 mPas,
ventilating the adhesive agents on the interior part and on the leather layer,
applying the backside of the leather layer to the interior part in the area having said adhesive agent applied thereto, and
hardening the adhesive agent.

20. Process as in claim 1, wherein said hardening of the adhesive agent is performed at room temperature 20° C. for up to forty-eight hours.

21. Process as in claim 20, wherein said subjecting of the leather layer to a heat treatment is performed at a temperature of 100°-110° C. in a drying stove for about four to six hours.

22. Process as in claim 20, wherein said applying of an adhesive agent to the interior part and applying of the adhesive agent onto the leather layer include the use of adhesive agents that are chemically similar, including a polyurethane base with about 10% hardener, said applying of the adhesive agent to the interior part including the use of an adhesive having much less solvent than the adhesive agent being applied onto the leather layer.

23. Process as in claim 20, wherein said applying of the adhesive agent to the interior part includes the use of an adhesive agent having a viscosity of about 4,800 mPas, and wherein said applying of the adhesive agent to the leather layer includes the use of an adhesive agent having a viscosity of about 690 mPas.

24. Process as in claim 1, wherein said subjecting of the leather layer to a heat treatment is performed at a temperature of 100°-110° C. in a drying stove for about four to six hours.

25. Process as in claim 1, wherein said applying of a water-soluble protective film includes the use of polyvinyl alcohol.

26. Process as in claim 1, wherein said applying of an adhesive agent to the interior part and applying of the adhesive agent onto the leather layer include the use of adhesive agents that are chemically similar, including a polyurethane base with about 10% hardener, said applying of the adhesive agent to the interior part including an adhesive having much less solvent than the adhesive agent being applied onto the leather layer.

27. Process as in claim 1, wherein said applying of an adhesive agent to the interior part includes the use of an adhesive agent having a viscosity of about 4,800 mPas, and wherein said applying of the adhesive agent to the leather layer includes the use of an adhesive agent having a viscosity of about 690 mPas.

28. Process for covering an interior part comprising:
subjecting a leather layer to a heat treatment at a temperature of about 100°-110° C. for about four to six hours,
cleaning by means of a solvent an area of the interior part that is to be covered,
applying an adhesive agent to the cleaned area of the interior part and to a backside of the leather layer,
ventilating the adhesive agents on the interior part and on the leather layer,
applying the backside of the leather layer to the interior part in the area having said adhesive agent applied thereto, and
hardening the adhesive agent.

* * * * *